Patented Apr. 1, 1941

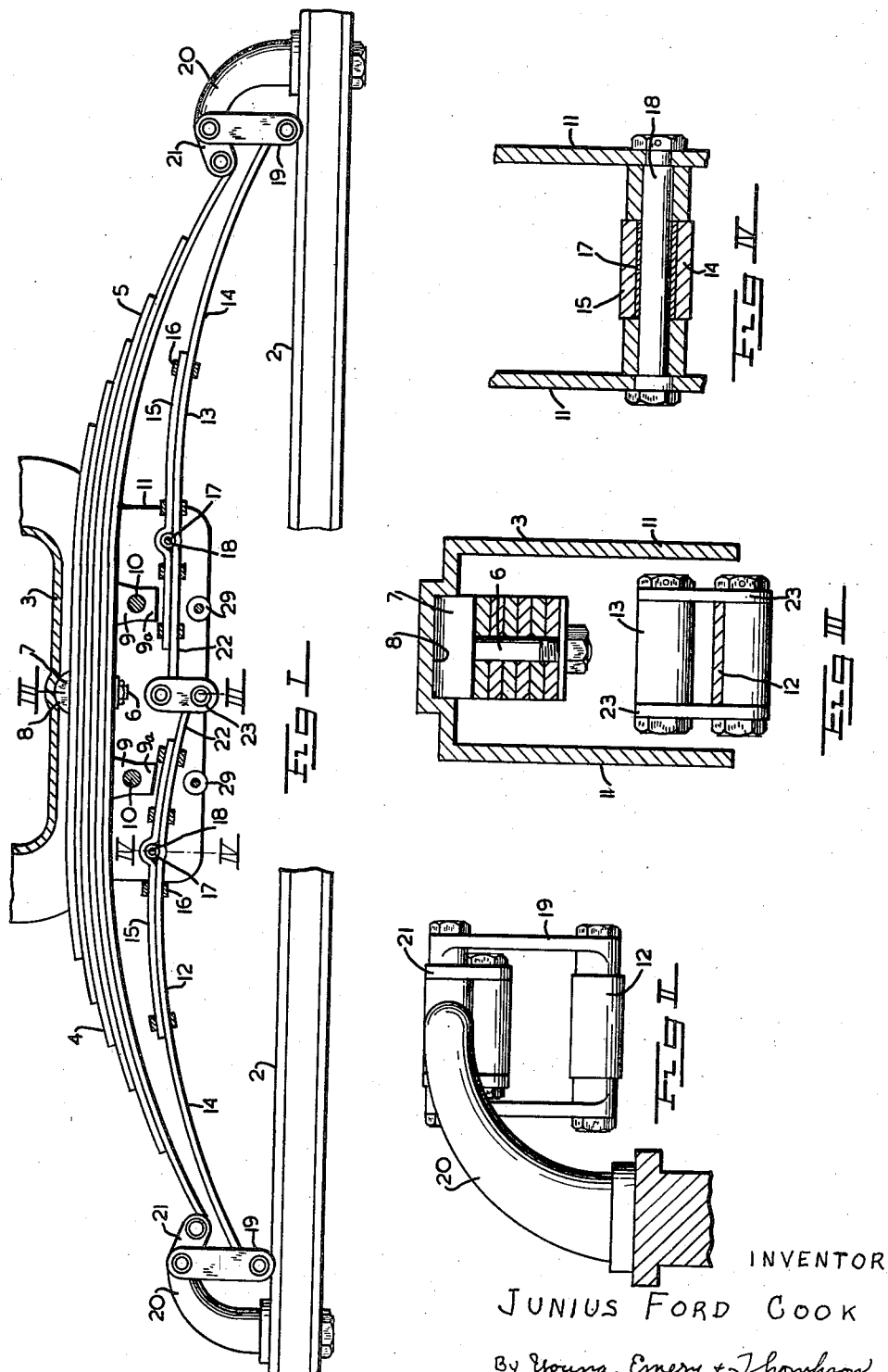

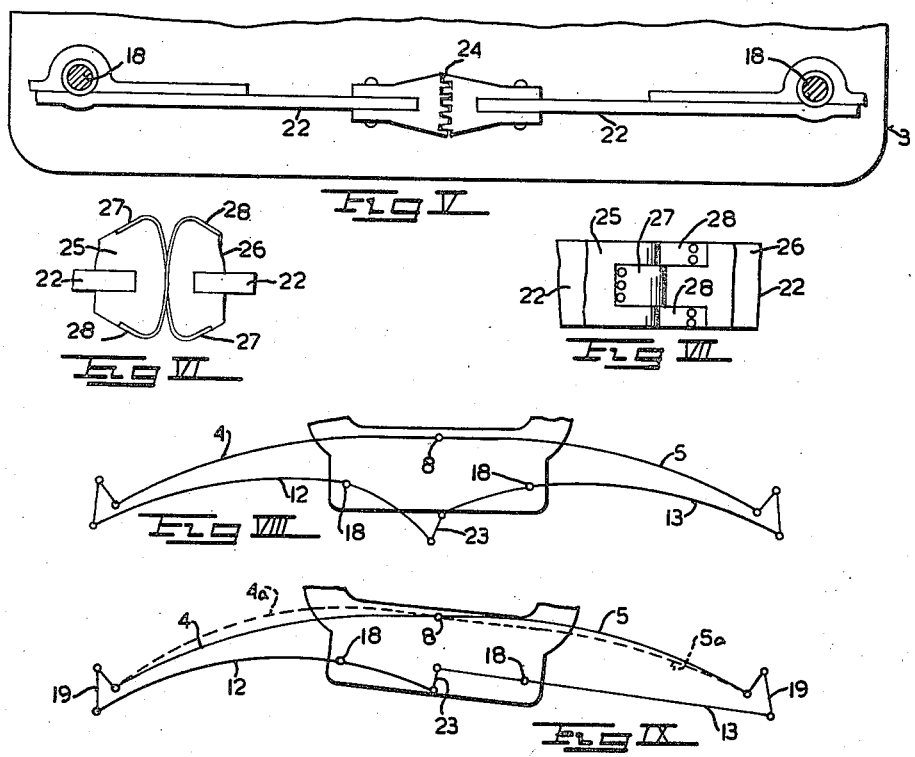

2,236,522

UNITED STATES PATENT OFFICE 2,236,522

STABILIZING MEANS FOR VEHICLES

Junius Ford Cook, Johannesburg, Transvaal,
Union of South Africa

Application March 11, 1938, Serial No. 195,404
In the Union of South Africa March 17, 1937

7 Claims. (Cl. 267—11)

The normal springs by which the chassis of a vehicle is supported upon an axle thereof permit, between the chassis and the axle, relative movement in a vertical plane which may be considered as comprising a parallel component characterised by said parts moving parallel with one another and a tilting component consisting of their relative angular movement.

This invention relates to means for stabilizing the chassis of a vehicle and particularly a motor vehicle, of the kind comprising a parallel-motion linkwork which tends to suppress the tilting component, but leaves the parallel component unhampered.

If such linkwork were rigid in the sense that the individual linkwork elements were rigid and connected to one another and to the chassis and axle by positively acting joints, the linkwork would to a large extent neutralise the supporting springs and would itself transmit shocks between the axle and the chassis. In prior constructions this drawback has been to some extent avoided for the reason that certain of such joints were made resilient in order to enable the linkwork to move, and such resilient joints lessened the transmission of shocks, through the linkwork, from the axle to the chassis. According to the present invention the drawback in question is overcome by making the links themselves as leaf springs capable of bending in the plane in which the elements of the linkwork move relatively to one another.

According also to the invention a chassis stabilising device for a vehicle comprising an axle or axles, a chassis, and supporting springs between the axle or axles and the chassis, comprises a pair of symmetrically arranged leaf springs with the width of the leaf horizontal, one end of each leaf spring being connected to the axle or axles for pivotal and bodily movement, each leaf spring being pivotally connected to the chassis, the leaf springs being pivotally connected to one another so as to move together vertically and the other ends of the leaf springs being permitted freedom to move towards and from one another horizontally.

According to a further feature of the invention, the function of the supporting springs is, in normal operation, confined to substantially that of resisting the parallel component of the relative movement between axle and chassis and in combination therewith a stabilizing device is arranged for resisting the tilting component.

In order to deprive the supporting spring of its function of resisting tilting, it may be arranged as a transverse spring and be pivoted to the chassis.

In the accompanying drawings:

Figure I is an elevation viewed from an end of the vehicle, of one form of stabilizer arranged for transverse stabilization.

Figure II is an enlarged end elevation thereof.

Figure III is an enlarged section on III—III, Figure I.

Figure IV is an enlarged section on IV—IV, Figure I.

Figure V is an enlarged partial front elevation showing alternative means for connecting the stabilizer arms.

Figure VI is a similar view showing another alternative means.

Figure VII is a plan of Figure VI.

Figures VIII and IX are diagrams illustrating the operation of the device.

In Figures I to IV of the drawings, 2 indicates an axle of the vehicle and 3 a part of the chassis thereof.

The regular spring by which the chassis is supported on the axle is shown as a transverse spring, the halves of which are designated by 4, 5. Said spring may be rigidly clamped to the chassis in the usual manner; but preferably and as shown, it is attached to the chassis so that it can pivot relatively thereto in its vertical plane. For this purpose, the spring clamping bolt 6 is formed with a cylindrical head 7 seated in a similar recess 8 in the member 3. Said head and recess are maintained in engagement by the weight of the chassis exerted downwardly upon the spring, and, if desired, suitable holding means, such as a headed bolt extension 9, extending in a slot 9ª formed in the seat 8, may additionally be employed to retain the head in place in the seat. Rubber buffers 10 mounted on suitable cross bolts may be employed to limit the relative tilting movement of the spring 4, 5 with respect to the chassis.

The parallel motion linkwork comprises the two arms 12, 13 each constructed as a leaf spring. Each arm comprises, in the example shown, a main leaf 14 and a shorter leaf 15. The linkwork moves in a vertical plane and the spring leaves 14 and 15 are arranged with their width horizontal so that they are capable of bending in the plane of the movement of the linkwork. The arms are required to resist bending from their normal form either upward or downward, consequently when two or more leaves are present in each arm, they are coupled together by clamps 16.

The short leaf 15 adds strength and stiffness to the main leaf at its weakest part and is also utilised to form a pivot point in the arm by being bent to embrace, between itself and the main leaf, a bush 17. A pivot pin 18—seen in detail in Figure IV—passes through said bush and is secured at its ends to the flanges 11, 11.

The outer end of each arm 12, 13 is connected to the axle by means which permits of a pivotal movement and the relative horizontal bodily movement necessary to enable the arms to pivot about the pivots 18, 18 and also to enable the arms, acting as springs, to flatten or increase their curvature as the case may be. A suitable means consists of a shackle 19 which is conveniently hung from the perch 20 as the spring shackle 21. The inner ends 22 of the two arms 12, 13 are so connected to one another that they have a common vertical movement but so also that they can move towards and away from one another horizontally whereby their respective angular movements about their individual pivots 18, 18 are not interfered with. In Figure I they are shown as connected for this purpose by a shackle 23. Figure V shows the ends of the arms fitted with intermeshing toothed segments 24, whilst Figures VI and VII illustrate two plain segments 25, 26 at the ends 22. A strap 27, made for instance of spring tempered steel ribbon, is stretched from the upper end of segment 25, and between the faces of the segments, to the lower end of segment 26. A similar strap 28 is similarly stretched between the upper end of segment 26 and the lower end of segment 25.

In the ordinary course of travelling, relative movement in a vertical plane occurs between the axle and the chassis. The stabilising device takes part in such movement; and, to the extent that the movement is one which maintains the normal parallelism of the axle and the chassis, the movement of the stabilizing device is idle. That is to say, the arms 12, 13 merely tilt to equal angular extents on their pivots 18, 18 their inner ends dropping relatively to the pivots as their outer ends rise relatively thereto and vice versa; and no flexing of the arms occurs. Figures I and VIII show different positions of the parts when the movement is parallel.

When, however, the body tilts relatively to the axle, say to the right as shown in Figure IX—as may occur when a corner is rounded at some speed—the effect of the supporting spring if it is clamped to the chassis in the ordinary manner, is as indicated by the dotted lines 4a, 5a. That is to say the left-hand half 4 assists the tilting, at any rate until it is relieved of all downward load, whilst the right-hand half 5 is called upon to resist both the tilting force and the upward force exerted by the left-hand half 4. However, when the spring 4, 5 is pivoted at 8, as in Figure I, it remains unaffected by tilting within normal limits. The operation of the stabiliser is that the right-hand arm 13 is pressed down at the pivot 18. Said arm accordingly flattens and also rotates relatively to its pivot 18. Said arm therefore resists the tilting movement by its flattening and by pressing down on the connecting shackle 23. The left-hand arm 12 at the same time has its inner end pressed down by the shackle 23 and its pivot 18 lifted by the chassis and resists by increasing its curvature, using the left-hand end of the axle as an anchor point on which it actively pulls upward. In this respect it acts oppositely to the half 4 of the supporting spring 4, 5 when said spring is clamped in the normal manner to the chassis. As pointed out above, in the circumstances stated, said half 4 would continue to press down on the left-hand end of the axle as mentioned above.

The stabilising device acts similarly in all circumstances in which the chassis tends to tilt. For instance if the body is unsymmetrically loaded, the stabilising device is permanently flexed in a manner tending to neutralise the tilting effect of such loading.

It has been found that by pivoting the supporting spring 4, 5 and so relieving it of its tilting-resisting function, its stiffness can be substantially reduced as compared with ordinary practice, and the riding qualities of the vehicle correspondingly improve in respect of the vertical component of the relative movement between the axle and chassis.

It is preferred to arrange the stabiliser springs to assist the regular springs in their control of the parallel motion when the regular springs are excessively strained. The arrangements shown for this purpose consist in positioning the rubber buffers 10 so that the stabiliser springs make contact with them when the stabiliser springs rise unduly; and also to provide buffers 29, which may be similar to the buffers 10, in position to be contacted by the stabiliser springs when they are abnormally depressed relatively to the chassis.

The word axle in this specification is intended to include the case where a transverse pair of wheels is not mounted on a common rigid axle but each wheel of the pair has a stub axle separately sprung for independent movement. Accordingly the single word "axle" is to be read to include such a transverse pair of stub axles.

I claim:

1. In a vehicle having wheel-carrying axle means and a chassis, the combination, with said axle means and chassis, of a weight-carrying spring, means comprising a pivot for connecting the spring with the chassis at the medial portion of the spring, said spring being anchored on said axle means on opposite sides of said medial portion, whereby the chassis is yieldingly supported, yet tiltable, on said pivot for angular movement with respect to said axle means, and stabilizing means interconnected between said chassis and said axle means and comprising a pair of leaf springs having adjacent ends interconnected for relative angular movement, the remote ends of each of said leaf springs being connected on said axle means and each spring being pivotally connected on the chassis on opposite sides of said pivot, whereby the weight-carrying spring normally serves only to support the weight of the chassis on the axle means while the stabilizing means normally serves only to resist tilting movement of the chassis with respect to the axle means.

2. In a vehicle having wheel carrying axle means and a chassis, the combination, with said axle means and chassis, of weight-carrying spring means, and connecting means for attaching the axle means and the chassis on said spring means, said connecting means comprising a pivot whereby the chassis is yieldingly supported, yet tiltable, on said pivot, for angular movement with respect to said axle means, and stabilizing means interconnected between said chassis and said axle means and comprising normally unloaded resilient means operable to yieldingly resist relative angular movement between the chassis and said axle means in either direction about said pivot, including stops on the chassis in position to limit the tilting movement of the chassis with respect to the weight-carrying spring, whereby said weight-carrying spring may have a stabilizing effect when tilting movement is excessive.

3. In a vehicle having wheel carrying axle means and a chassis, the combination, with said axle means and chassis, of weight-carrying spring means, and connecting means for attaching the axle means and the chassis on said spring means, said connecting means comprising a pivot whereby the chassis is yieldingly supported, yet tiltable, on said pivot, for angular movement with respect to said axle means, and stabilizing means interconnected between said chassis and said axle means and comprising normally unloaded interconnected leaf springs interconnecting the chassis and said axle means and operable to yieldingly resist relative angular movement between the chassis and said axle means in either direction about said pivot, including stop means on the chassis in position to cooperate with said stabilizing means to limit the movement of said leaf springs on the chassis and permit the leaf springs to have a weight-carrying function at the limits of relative movement of the chassis with respect to the axle means defined by the engagement of said leaf springs with said stops.

4. In a vehicle having wheel carrying axle means and a chassis, the combination, with said axle means and chassis, of weight-carrying spring means, and connecting means for attaching the axle means and the chassis on said spring means, said connecting means comprising a pivot whereby the chassis is yieldingly supported, yet tiltable, on said pivot, for angular movement with respect to said axle means, and stabilizing means interconnected between said chassis and said axle means and comprising normally unloaded interconnected leaf springs interconnecting the chassis and said axle means and operable to yieldingly resist relative angular movement between the chassis and said axle means in either direction about said pivot, including stop means on the chassis in position to limit the tilting movement of the chassis with respect to the weight-carrying spring, said stop means serving also to limit the movement, on the chassis, of said leaf springs, whereby said weight-carrying spring may have a stabilizing effect and said leaf springs may have a weight-carrying function when the same, respectively, are at the limits defined by the stop means.

5. The combination as set forth in claim 1, wherein the adjacent interconnected ends of said leaf springs carry drivingly connected segments formed with intermeshing gear teeth.

6. The combination as set forth in claim 1, wherein the adjacent ends of said leaf springs are fitted with heads formed for rolling movement, the one upon the other, and flexible strap means connecting one side of one head with the remote side of the other.

7. The combination as set forth in claim 1, including shackle means interconnecting the adjacent ends of said leaf springs.

JUNIUS FORD COOK.